(12) United States Patent
Rector

(10) Patent No.: US 6,301,308 B1
(45) Date of Patent: Oct. 9, 2001

(54) SYSTEM AND METHOD FOR HIGH SPEED DATA TRANSMISSION

(76) Inventor: Robert Rector, 12290 Brassica St., San Diego, CA (US) 92129

( * ) Notice: Subject to any disclaimer, the term of this patent is extended or adjusted under 35 U.S.C. 154(b) by 0 days.

(21) Appl. No.: 09/103,680

(22) Filed: Jun. 23, 1998

(51) Int. Cl.[7] .................................................. H04L 27/00
(52) U.S. Cl. .......................................... 375/270; 375/259
(58) Field of Search .................................... 375/270, 260, 375/267, 269, 308, 314, 259; 370/500, 491, 525

(56) References Cited

U.S. PATENT DOCUMENTS

| | | | |
|---|---|---|---|
| 3,980,824 | 9/1976 | Lamb et al. ............................ | 178/67 |
| 4,742,532 | 5/1988 | Walker .................................... | 375/50 |
| 4,866,737 | 9/1989 | Seifried .................................. | 375/22 |
| 5,185,765 | 2/1993 | Walker .................................... | 375/22 |
| 5,517,528 | 5/1996 | Johnson ................................. | 375/259 |
| 5,640,422 | 6/1997 | Johnson ................................. | 375/259 |
| 5,689,529 | 11/1997 | Johnson ................................. | 375/259 |
| 6,097,714 | * 8/2000 | Nagatani et al. ..................... | 370/342 |

OTHER PUBLICATIONS

Attain High Bandwidth Efficiency With VMSK Modulation, Microwaves & RF, Dec. 1997.
Using VPSK in a Digital Cordless Telephone/Videophone/ISDN Modem, by H.R. Walker, Pegasus Data Systems, Applied Microwave & Wirless, Jan./Feb., 1997.
The Official 56K Modem Web Site; What is V.90?, available on the Internet by at least Jun. 09, 1998.
Net Access to Home Vies for Bandwidth, by Stephan Ohr, Tech Web News, Dec. 02, 1996.
Floor It . . . Tech Talk and Tips for 56k Modems, by B.A. Nilsson, May 29, 1997.
Infinite Possibilities, By the Editors of tele.com, Apr. 01, 1997.

* cited by examiner

*Primary Examiner*—Chi Pham
*Assistant Examiner*—Kevin M Burd
(74) *Attorney, Agent, or Firm*—Workman, Nydegger & Seeley

(57) ABSTRACT

Systems and methods for high speed data transfer that are capable of transferring a vast amount of data in very little bandwidth using current technology are disclosed. The systems employ a plurality of substantially phase continuous waveforms comprised of a plurality of events. Each event is preferably formed by either a positive or negative half period sinusoidal signal with a duration that varies between some minimum and maximum value to encode a data word on each event of the waveform. The event width variations are typically small to maintain a small frequency variation for each individual waveform. In order to allow a receiver to detect the very small time differential between different event widths, a pilot tone is also placed in the waveform. In a receiver, this pilot tone is recovered and used to phase lock the receiver clock, which typically operates at much much greater frequency than the pilot tone. This phase locked receiver clock can then be used to time the zero crossings of each event in order to extract the data word encoded into each event of the phase continuous waveforms. The individual substantially phase continuous waveforms are extracted from the receive signals via a bank of narrowband filters. By using narrowband filters to extract each phase continuous waveform, the amount of noise competing with the waveform can be reduced.

35 Claims, 4 Drawing Sheets

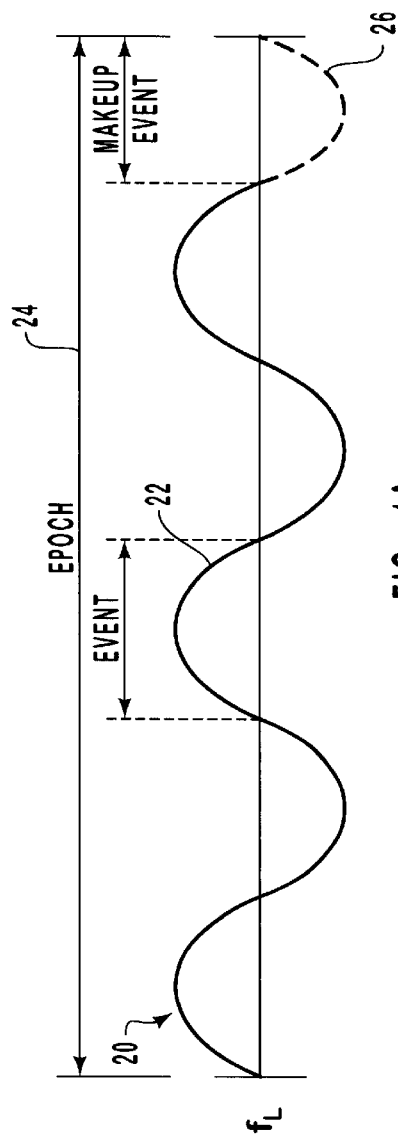
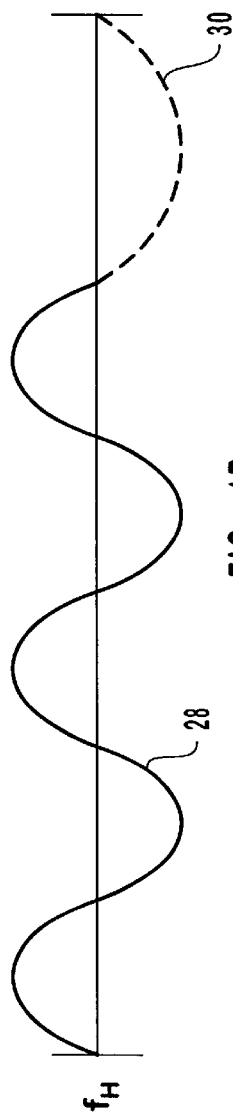
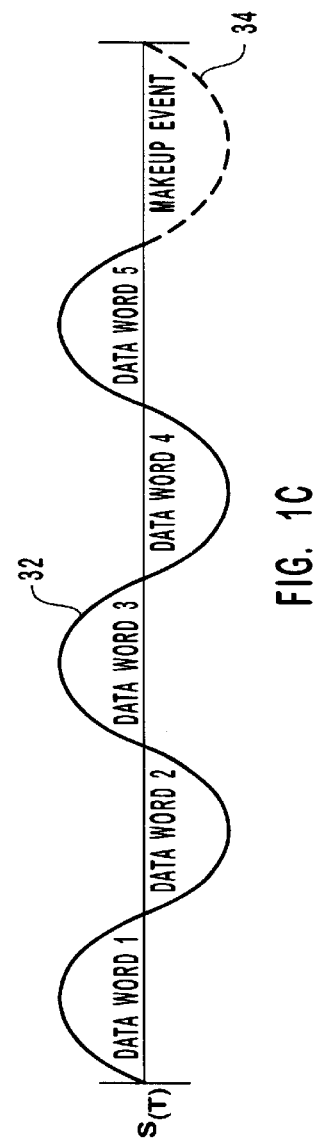
FIG. 1A
FIG. 1B
FIG. 1C

SYSTEM AND METHOD FOR HIGH SPEED DATA TRANSMISSION

BACKGROUND OF THE INVENTION

1. The Field of the Invention

This invention relates to systems and methods for transferring data between a sending system and a receiving system. More particularly, the present invention relates to high speed transmission of information over band-limited channels.

2. The Prior State of the Art

The time to send information from one place to another was, at one time, measured in days or weeks. Today, however, an ever increasing array of technologies have reduced the time to minutes or seconds. In the United States, nearly every home has a telephone that allows instant voice and data communication with virtually any location within the United States and most industrialized countries. Wireless and cellular communication devices allow contact with individuals in virtually any location. Networks allow almost instantaneous communication between computers, whether separated by a few feet or vast geographic distances. The Internet, a global network of computers, provides an almost endless variety of information that can be accessed from a telephone line virtually anywhere. Satellites and other wireless technology also provides a wide variety of information including entertainment, communication, and other services.

As the need and desire to transfer information through a wide variety of networks has increased, the burden on the networks has dramatically increased. For example, although the Internet started as an experimental project to communicate information between large research centers, many homes and businesses today have accessed to, and regularly use, the Internet to transfer vast amounts of information. This has, in turn, created burdens on the public switched telephone network (PSTN) that were unenvisioned when the network was constructed. In many areas, the increased burden has resulted in an insufficient capacity to carry both the data traffic and normal telephone traffic. Many companies and individuals have severely criticized telecommunications service providers, calling again and again for an end to the bandwidth bottlenecks in their networks. Given the need and interest in data communications, many techniques have been developed for compressing data bandwidth in communication systems in order to squeeze as much information through a bandwidth limited network as possible.

The PSTN, which carries a large percentage of the telecommunication traffic today, has been constructed with a combination of fiber optic cables and copper wire cables. The communication bandwidth of a fiber optic cable, generally employed as trunk lines, is much greater than the communication bandwidth of the copper wire that is generally employed to an individual home. While theorists conjecture that future techniques, such as wavelength division multiplexing, may allow a single fiber optic cable to someday transport up to twenty-five terabits of data per second, such a solution is a very long ways off. Costs, regulatory uncertainty, operational issues, and questions regarding real demand are all slowing the push for large bandwidth communication networks in the mass market. Some experts have projected that it will take at least twenty years to fully replace the copper wiring in today's telephone network with fiber optic cable. Thus, there currently exists a large need for squeezing as much data through a typical copper cable utilized in the telephone network as possible.

Similar considerations dominate the wireless communications arena. Because the frequency spectrum is limited, regulatory control of the frequency spectrum is typically much greater than in wired networks. The hurdles required to create a local wired network are much less than the hurdles required to create a local wireless network. Thus, portions of the frequency spectrum are assigned under strict regulatory control and signaling schemes must be employed that restrict any individual's use to their allotted portion of the spectrum.

Filters at the edge of the core telephone network limit voice grade bandwidth to about 3.3 kHz. That roughly translates to a top data rate of about 33.6 kbps for normal analog modems and up to about 53 kbps for some of the newer modem technologies. One emerging technology which promises to further increase the amount of information transferred over copper wire are digital subscriber links (DSL). Although a variety of different DSL exist, the ones that achieve the highest data rates are asymmetric digital subscriber links (ADSL). It is theorized that at least eighty percent of all telephone service subscribers are within 18,000 feet of a central office. It is anticipated that these customers will be able to get at least 1.5 megabits per second downstream (from the network to the user) and anywhere from 16 to 640 kbps upstream over ADSL equipped copper lines. At shorter lengths, ADSL speeds may increase.

ADSL uses frequency multiplexing, with one frequency band for regular phone service, another for upstream data, and a third for downstream data. Each of these bands uses efficient digital transmission techniques, such as quadrature amplitude modulation (QAM), to modulate a carrier with many different levels to get thousands of bits on a single frequency. Of course these speeds can only be achieved by removing the 3.3 kHz bandwidth limitation set by the voice grade filters.

Although ADSL seems to hold great promise, several problems exist. As previously noted, in order for ADSL to be a viable option, the 3.3 kHz bandwidth limitation must be removed. Furthermore, in many instances the particular pair of copper wires utilized must be tested and selected based on an adequate throughput. The increased bandwidth of ADSL is only available to those who live within a certain distance of a central office. Furthermore., ADSL requires costly equipment upgrades. Finally, although ADSL will work for certain types of subscribers, ADSL techniques provide no benefit to other networks, such as wireless communication networks. What is needed is a mechanism that may be used in a variety of environments to increase the transmission rate for a given bandwidth in order to transmit more data for a given bandwidth than is presently available.

In order to transmit more data in a given bandwidth, many systems have turned to compression techniques which compress a given block of data prior to transmission, transmit the data at a given data rate, and then uncompress the data at the receiving system. This is the approach taken, for example, by modems adhering to the V.42bis, which is one mechanism that has been used to increase the data rate down traditional analog phone lines to about 33.6 kbps. These mechanisms have the advantage of increasing the effective data throughput without increasing the actual transmission rate of the data. However, because such mechanisms do not increase the basic transmission rate of the data, there are limitations to how much additional throughput can be gained using such an approach. It would, therefore, be an advancement in the art to increase the basic underlying data rate down a fairly narrowband channel, such as an analog telephone line.

In order to increase the effective throughput over traditional analog telephone lines, a new generation of modems has recently been developed. These modems are the so-called. "56 k" modems. Although competing standards exist, in general 56 k modems attempt to increase the throughput by recognizing that rather than an analog modem connected to each end of a telephone line, typically the service provider end has a digital modem available. By placing a digital modem at the service provider end of the telephone line, the system may convert analog data to digital data prior to sending it to the service provider and the service provider can avoid converting digital data to analog data prior to sending it over the telephone network to the local modem. This results in greater throughput downstream but retains the traditional limitations on speed when sending data upstream.

It should be noted that all of these attempts to increase throughput do not address the fundamental problem of squeezing more information into a fixed bandwidth. Many, if not all, of the present proposals that claim to increase throughput are either based on compressing data prior to transmission or are based on either increasing the bandwidth of existing infrastructure or replacing existing infrastructure with new infrastructure having an increased bandwidth. It would, therefore, be an advancement in the art to provide systems and methods that dramatically increases the data throughput for a fixed bandwidth.

SUMMARY AND OBJECTS OF THE INVENTION

The problems in the prior state of the art have been solved by the present invention which is directed to systems and methods for high speed data communication over a limited bandwidth. In particular, the present invention introduces a signaling scheme which is capable of dramatically increasing the data throughput for a given bandwidth. The signaling scheme is capable of producing efficiencies which, when measured in bps per Hertz of bandwidth, are many times greater than the best signaling schemes available.

The signaling scheme takes the available bandwidth and divides it into a plurality of individual data channels. Each data channel carries a substantially phase continuous, narrowband waveform having data words encoded into the structure of the waveform. In one implementation, the narrowband waveforms are comprised of a plurality events. Each event is formed by either a positive or negative half sinusoidal signal with a width that is proportional to both the frequency channel and the data word encoded thereon. The result is a substantially phase continuous narrowband waveform with a data word encoded into each half sinusoid event so that the width of the half sinusoid, and corresponding frequency of the half sinusoid, falls between some minimum and maximum value. The width of the half sinusoid, and hence the range of frequency variations within the narrowband waveform, are selected to be a small fraction of the total bandwidth available. In addition to the plurality of narrowband waveforms, a substantially phase continuous pilot or clock tone is also created and added to the waveform. Thus, the transmitted waveform is comprised of a plurality of substantially phase continuous waveforms and a pilot tone.

In many embodiments it is desirable to select the fundamental frequencies of each data channel and the frequency of the pilot tone to have a common multiple so that the fundamental frequencies of each data channel and the pilot tone all line up with a defined period. This defined period is referred to as an epoch and defines a point in time when clock phases may be resynchronized to reduce receiving errors as described below.

When the transmitted waveform is received, the waveform is placed through a bank of narrowband filters, one of which is centered around the pilot tone frequency and the others of which are centered around the individual data channels. The filter centered around the pilot tone then feeds a pilot tone recovery circuit which produces a signal that is phase locked to the pilot tone and which is used to phase lock a higher frequency receiver clock to the pilot tone. Phase locking the receiver clock to the pilot tone allows the timing tolerances necessary for reception of the narrowband signals and the decoding of the data words encoded therein.

The individual narrowband waveforms are each processed in a similar manner. The narrowband filter of a particular data channel is used to feed a zero crossing detector which detects subsequent zero crossings of the narrowband waveform. The zero crossing detector is used to enable a counter which is driven by the phase locked receiver clock. The counter then measures the time differential between subsequent zero crossings and the counter value is used to determine the data word encoded into the width of the individual pulses of the narrowband waveform. The data words from each channel are then reassembled in the proper order in order to recover the transmitted data.

As previously mentioned, it is desirable that the pilot tone and the fundamental frequencies of the individual data channels all line up at a given epoch time. Because each of the individual data waveforms varies slightly in frequency from event to event, the last event in the epoch for each of the data waveforms must be of a defined length in order to make all waveforms align at the epoch time. Thus, this last event is referred to as a "makeup signal" or "makeup event" and is not used to carry data. This is because the width of the makeup event is completely determined by the information transmitted prior to the makeup event during the current epoch. When the epoch time arrives, any accumulated phase error in the phase-locked clock of the receiver can be zeroed. This helps the receiver maintain the tight phase tolerances necessary to measure the very small frequency variations that occur between each event of the individual narrowband waveforms.

The limiting factor on the amount of data that may be transferred per hertz of bandwidth is the frequency of the receiving clock and the phase jitter in locking the receiving clock to the clock tone. However, using current technology it is anticipated that data rates of between about 200 kbps and about 450 kbps can be transmitted in a 3 kHz bandwidth. This results in efficiencies, measured in bps per hertz of bandwidth, of between about 67 and about 150. These numbers are dramatically larger than any known signaling scheme.

Although it is anticipated that current receivers will process received waveforms using the analog components described above, it is theoretically possible to use digital processing methods as well.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which:

FIGS. 1A through 1C illustrate examples of a single narrowband waveform of one embodiment of the present invention.

DETAILED DESCRIPTION OF THE PREFERRED EMBODIMENTS

Figure 2:
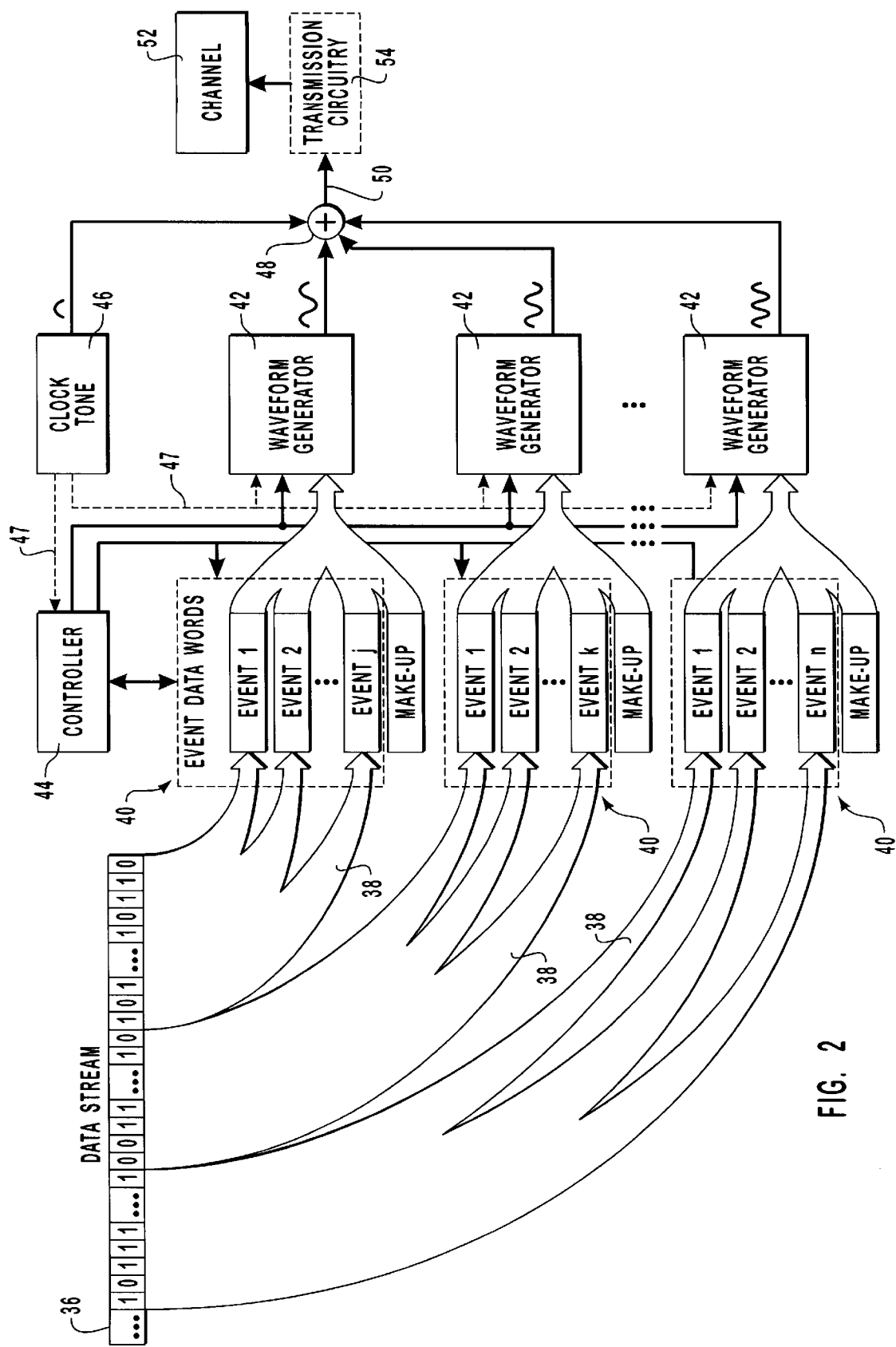
FIG. 2 illustrates a representative transmitter of an embodiment of the present invention.

The present invention is directed to a signaling scheme which dramatically increases the amount of data that can be transferred over a channel with a limited bandwidth. The signaling scheme is capable of transmitting data at a much greater rate than any existing signaling scheme. The invention is equally applicable to any band-limited channel, whether wireless or wired. Because the present invention operates to actually increase the data rate of the information flowing through the channel, the present signaling scheme may be combined with existing coding and compression methods to yield effective throughputs that are much greater than the actual data throughput presented herein.

The signaling scheme of the present invention utilizes a plurality of narrowband waveforms combined with a pilot tone to yield a waveform that can transmit a tremendous amount of data over a very narrowband channel. Referring first to FIGS. 1A through 1C, the anatomy of a single narrowband waveform is presented. The narrowband waveforms of the present invention typically comprise a plurality of signals that may be combined to yield a substantially phase continuous waveform. In one embodiment, a half sinusoidal signal is used, although other signal shapes may also be utilized. FIG. 1A presents a sinusoidal waveform operating at frequency $f_L$. In FIG. 1A, the waveform is illustrated generally as 20. Each half sine signal of the waveform is termed an event as illustrated, for example, by event 22. A certain number of cycles of the waveform are combined, along with a makeup event, to create an epoch. In FIG. 1A, the epoch is illustrated by the duration labeled 24 and the makeup event is illustrated as 26. The purpose of makeup event 26 will become clear in the discussion that follows.

At frequency $f_L$ each event 22 has a fixed duration. If the frequency is changed to a second frequency, $f_H$, the duration of each event will change. This is illustrated in FIG. 1B where events 28 each have a shorter duration than events 22 of FIG. 1A. This indicates that frequency $f_H$ is greater than frequency $f_L$. Accordingly, assuming epoch time 24 remains constant, makeup event 30 becomes longer (lower frequency) than makeup event 26. Note that in both FIGS. 1A and 1B the same number of events per epoch are maintained with the difference being accounted for by the width of makeup event 30 versus makeup event 26.

In the present invention, assuming that the zero crossing points of each event can be measured with sufficient accuracy, only a single event, or one half sine wave, need be measured to determine the frequency of the waveform. In other words, it is possible to construct a waveform from a series of half sine waves where each individual half sine varies in width between some minimum and maximum value. By correlating the width of each event to a data word, it is possible to decode which data word is represented by a particular pulse simply by measuring the duration of the event between zero crossings of the waveform. Thus, FIG. 1C presents a waveform, s(t), where individual data words are encoded into each event 32 using the width of the event. At the end of five data words, a makeup event 34 is inserted into the waveform to bring the waveform back to zero at epoch time 24. If each individual event 32 is between the duration of the event 22 and the duration of event 28, of FIGS. 1A and 1B respectively, then makeup event 34 will lie somewhere between makeup event 26 and makeup event 30. The resultant waveform, s(t), is a narrowband waveform that fluctuates in frequency during each half period cycle. The resultant narrowband waveform carries a large percent of its energy in a very narrow frequency band, assuming little frequency variation between $f_L$ and $f_H$. Because most of the energy is contained in a narrow frequency band, the energy may be recovered by a receiver with a very narrowband filter. Reception and decoding of the waveform will be discussed hereafter.

By utilizing a plurality of waveforms, such as that illustrated in FIG. 1C, a large amount of information may be transferred through a plurality of data channels. As explained hereafter, by selecting the minimum and maximum frequency variations for each waveform and by utilizing a receiver with certain characteristics, the total amount of information that may be transferred over a limited bandwidth is considerably more than present signaling schemes.

As an alternative to the signaling scheme illustrated in FIGS. 1A through 1C above, events may be constructed from different signals. In other words, waveforms other than a half sine wave may be used for the events. In one embodiment, quarter sine waves are used. In this embodiment, each event comprises one fourth of a single period of a sine wave. The width of each event would still correspond to a data word encoded in the event. In this embodiment, the makeup event would also comprise a quarter sine wave. The number of data carrying events would thus be equal to two times the number of events in the embodiment of FIGS. 1A–1C plus one. It is anticipated that using quarter sine wave events would increase the data carrying capacity of the substantially phase continuous waveforms. In other embodiments, waveforms other than a sine wave may be used as the fundamental basis for the events. This, however, will cause the frequency spectrum of the substantially phase continuous waveform to spread. The implications of a broadened frequency spectrum are discussed in greater detail below.

Referring now to FIG. 2, one embodiment of a receiver according to the present invention is illustrated. In FIG. 2, data to be transmitted is illustrated by data stream 36. Data stream, as used herein, is intended to depict any amount or quantity of data that is to be transferred using the present invention. Thus, data stream 36 may be an actual stream of data, such as a multimedia stream or other stream of data, or may represent a fixed quantity of data such as a block or file of data to be transferred, or multiple data streams, block, or files from either a single source or from multiple sources. If multiple data streams are transferred, the data streams may be dependent or independent. Dependent data streams have a common time reference while independent data streams do not. The ability to transfer independent data streams is particularly useful when transferring multiple data packets from different sources using a common transmitting and receiving system. As discussed in conjunction with FIGS. 1A through 1C above, data that is to be transferred is encoded into a series of events that are combined to form a substantially phase continuous waveform. As previously discussed, a data word is encoded into each event of the waveform. Thus, embodiments within the scope of the present invention may comprise means for dividing a data stream into a plurality of data words. By way of example, and not limitation, in FIG. 2 such means is illustrated by arrows 38 which show data stream 36 being broken up into event data words, illustrated generally as 40. As discussed in greater detail below, assuming the epoch structure previously explained in conjunction with FIGS. 1A though 1C is used, it is anticipated that the data words for an epoch will be placed into one or more data buffers that can be used to create the events that make up the plurality of substantially phase continuous waveforms utilized to transfer information according to the present invention. Thus, the dashed lines surrounding event data words 40 may represent one or more data buffers into which a sequence of data to be transferred is placed. Because the data words are encoded into a plurality of substantially phase continuous events, embodiments within the scope of this invention may comprise means for generating a plurality of events. By way of example, and not limitation, in FIG. 2 such means for generating is illustrated by waveform generators 42. Waveform generators 42 may be any type of hardware and/or software that can generate an appropriately-shaped signal that is correlated to the data word to be transferred. Furthermore, waveform generator 42 should be able to string the generated signals together in a substantially phase continuous manner in order to produce a substantially phase continuous waveform.

One method of implementing waveform generator 42 utilizes one or more direct digital synthesizers. A direct digital synthesizer receives as an input a digital word and generates, in response to the input, a designated analog waveform. Direct digital synthesizers are used to create a mapping between a particular digital word and a particular analog waveform. Thus, direct digital synthesizers are ideal for implementing waveform generator 42. A direct digital synthesizer may be created and programmed to map a given event data word to a particular width event. In this manner, event data words may be mapped to individual signals and the individual signals may be strung together to create a substantially phase continuous waveform.

The exact waveform shape and the required amount of phase continuity will dictate whether waveform generator 42 can be constructed utilizing a single direct digital synthesizer or whether multiple direct digital synthesizers are needed. Direct digital synthesizers typically require a certain amount of setup time. In other words, there is a delay from the moment that the data word is input until the analog waveform may be generated. If a high degree of phase continuity is required, it may be necessary to utilize multiple direct digital synthesizers in order to create one of the substantially phase continuous waveforms utilized in the present invention. Utilizing two direct digital synthesizers will allow one direct digital synthesizer to be producing an analog signal while the next event data word to be transferred can be given to the other direct digital synthesizer so that at the conclusion of the signal being generated the other direct digital synthesizer can take over and produce the next signal. By alternating back and forth between the two direct digital synthesizers, a waveform can be generated from individual signals that have a very high degree of phase continuity between the signals. If, on the other hand, a larger degree of phase discontinuity can be tolerated for a particular implementation, then perhaps a single direct digital synthesizer would be sufficient.

As will be explained in greater detail below, in embodiments that transfer a large amount of information in limited bandwidth it is important to maintain phase continuity between individual pulses of a waveform in order to confine the energy of the waveform to a relatively narrow frequency spectrum. Thus, the event shape used as well as the amount of phase continuity between events will determine how much frequency spread, beyond that introduced by the varying event widths, is introduced into the waveform. In the representative signal sets presented below, it is apparent that a high degree of phase continuity will be required to confine the energy to the narrowest possible spectrum. In one embodiment, each event is a half sine wave with alternating positive and negative aspects to form a substantially phase continuous waveform, as previously described. Another embodiment uses quarter sine wave events. Other embodiments may use still other event shapes.

Although an example implementation of waveform generator 42 has been giver utilizing direct digital synthesis, other mechanisms may also be used to generate the appropriate waveforms. In other contexts, it has been possible to generate a rectangular waveform using a counter or other digital mechanism and then filter the rectangular waveform through various types of filters to produce an analog waveform that is; substantially phase continuous and wherein the signals of the analog waveform are substantially the same width as the pulses of the rectangular waveform. In certain implementations of the present invention, it may also be possible to utilize this approach, or a similar approach. In order to transfer a large amount of data, it is necessary to control the width of the analog signals produced by waveform generator 42 to a high degree of accuracy. This will be illustrated by representative signal sets presented below. The inability to control the signal widths produced by waveform generator 42 to a high degree of accuracy will reduce the amount of data that can be transferred over a given bandwidth using the present invention. Thus, whether a particular implementation of waveform generator 42 is suitable in any particular application will be totally dependent upon the amount of data that is to be transferred over a given bandwidth. Higher amounts of data will require a higher degree of control over both the individual signal widths and the phase continuity between consecutive signals.

Toward the end of an epoch, a makeup signal or event is placed in each of the substantially phase continuous waveforms to cause them to align at the epoch time. Embodiments within the scope of the present invention may, therefore, comprise means for inserting a makeup time into the waveform. Such a means may be any mechanism that causes the appropriate length makeup time to be inserted. By way of example, and not limitation, such a means is illustrated in FIG. 2 by makeup word 41. Since waveform generator 42 already maps digital words to analog events, it can also be used to map makeup words to the appropriate length makeup event. The minimum and maximum lengths of the makeup events can be easily calculated from $f_L$ and $f_H$, respectively. Furthermore, it is also possible to easily calculate the duration of a required makeup event, simply by subtracting the duration of each event from the epoch time as it is transmitted.

Operation of a transmitter constructed according to the present invention may be under the direction of some means for controlling operation of the transmitter. By way of example, and not limitation, in FIG. 2 such a means is illustrated by controller 44. In FIG. 2 controller 44 is illustrated as having control over waveform generators 42 and event data words 40. This is to illustrate that a controller, such as controller 44, may be required to control operation of the various waveform generators 42 and make sure that event data words are taken from a data stream or data buffer and used as input to waveform generators 42 at the appropriate moment. Controller 44 may also be used to control other aspects of a transmitter constructed according to the present invention, such as the calculation of makeup words 41. Basically, controller 44 may be utilized to control any circuitry that is part of a transmitter constructed according to the present invention that needs appropriate control signals at an appropriate time.

The plurality of substantially phase continuous waveforms generated by the plurality of waveform generators 42 are combined with one or more pilot tones prior to transmission. Thus, embodiments within the scope of this invention may comprise means for generating a pilot tone and means for combining the plurality of substantially phase continuous waveforms and a pilot tone into a transmission waveform. By way of example, and not limitation, in FIG. 2 the means for generating a pilot tone is represented by clock tone generator 46 and the means for combining is illustrated as summing circuit 48. Clock tone generator 46 may comprise a stable oscillator to generate a stable clock tone. The stability of clock tone generator 46 is one factor that will determine how much data can be transferred over a given bandwidth using signaling schemes according to the present invention. The impact of the stability of clock tone generator 46 will be discussed in greater detail below.

In some embodiments, it may be desirable to phase lock the operation of one or more components in the transmitter to the pilot tone generated by clock tone generator 46. This possibility is illustrated by dashed lines 47. This may be useful, for example, in ensuring that waveform generators 42 produce waveforms that maintain phase coherence with the pilot tone generated by clock tone generator 46. In the alternative, other timing mechanisms may also be used. For example, a transmitter according to the present invention may contain a local clock operating at a frequency different from clock tone generator 46. This local clock may then be used to derive the tone generated by clock tone generator 46 as well as dictate the timing for waveform generators 42 and other components of the transmitter. These various mechanisms may be viewed as examples of means for maintaining phase coherence between the plurality of substantially phase continuous waveforms and a pilot tone.

The output of summing circuit 48 will be a transmit signal or a transmit waveform. Depending on the desired transmission frequency, transmit signal 50 may be placed directly into the transmission channel 52 or additional processing may be required. Such additional processing is illustrated by transmission circuitry 54. For example, if it is desired to transmit the waveform at RF frequencies, then transmission circuitry 54 may contain mixers, filters, wave guides, antennas, amplifiers, and other such hardware necessary to take the relatively low frequency transmit signal 50 and place it into the appropriate frequency range and, ultimately, transmit the signal. In other implementations, transmit signal 50 may be at an appropriate frequency to be place directly into transmission channel 52. Such would the case, for example, with a waveform generated to be placed onto a standard telephone line, which typically has a frequency range of between about 500 Hz and about 3.5 kHz.

In addition to the circuitry illustrated in FIG. 2, a transmitter according to the present invention may also comprise a variety of other components. Such components may include microprocessors or other controllers, oscillators or clocks, filters for shaping various frequency spectrums of signals, and so forth. In one embodiment of the present invention, an additional clock tone generator is included to produce a second pilot tone at a frequency different from the tone produced by clock tone generator 46. If channel 52 has a substantial amount of phase dispersion, so that the phase shift imparted to each signal is a function of the frequency of that signal, it may be desirable to place a second pilot tone in the transmit signal in order to provide a greater immunity from the effects of phase dispersion. How a second pilot tone can be used to combat phase dispersion is discussed in greater detail below.

Figure 3:
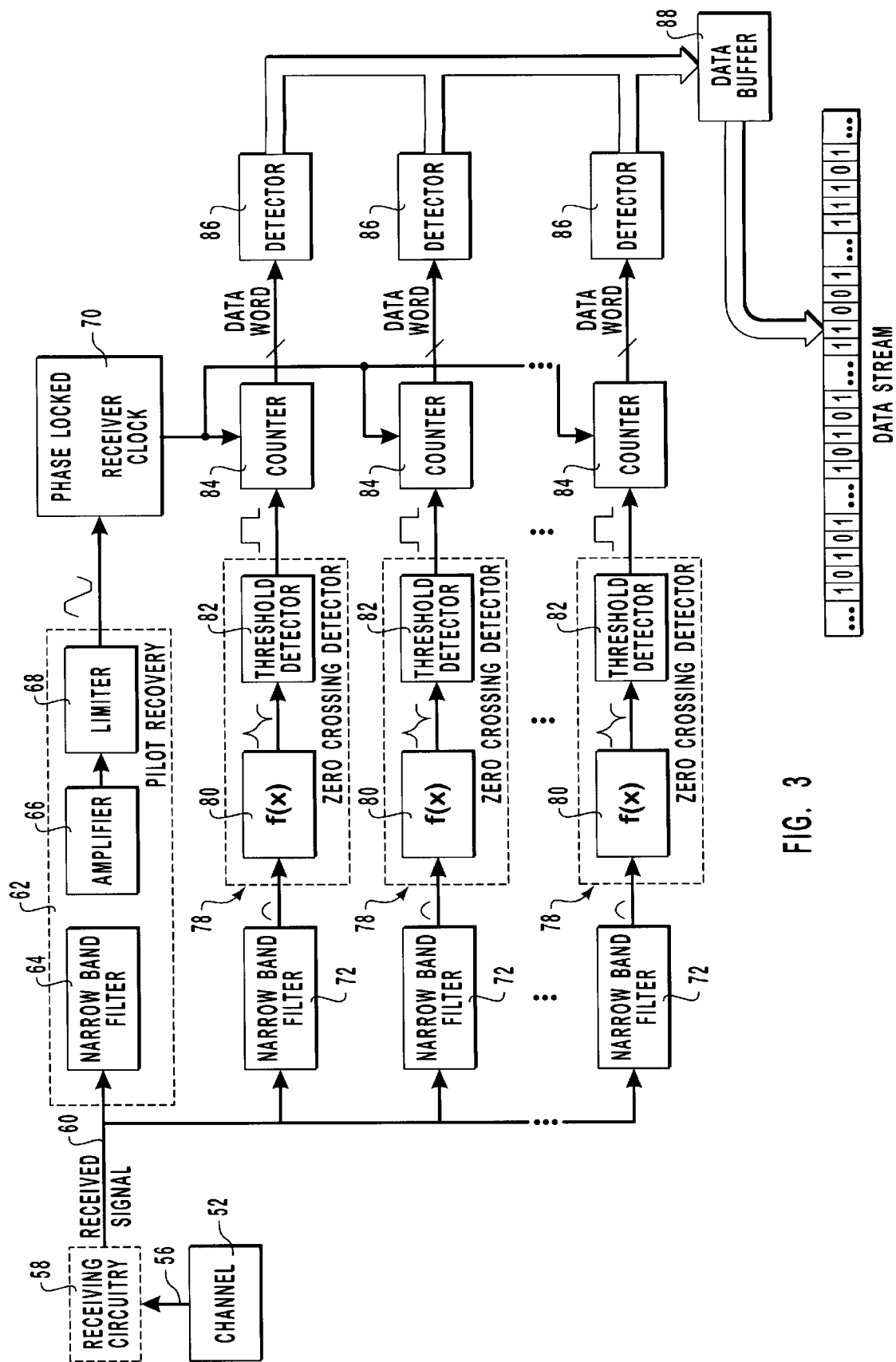
FIG. 3 illustrates one receiver of a particular embodiment of the present invention.

Referring now to FIG. 3, an example of a receiver constructed according to the present invention to receive and decode a transmit signal produced according to the present invention, either by a transmitter such as that illustrated in FIG. 2, or another transmitter. The receiver illustrated in FIG. 3 basically uses analog components to process the received signal and extract the appropriate information. However, other receiver implementations are possible and the principles illustrated in FIG. 3 will serve to illustrate the functions that need to be performed to receive and decode a signal according to the present invention.

In FIG. 3, signal 56 is received from transmission channel 52. Depending on the frequency of signal 56, it may be passed through receiving circuitry 58 to convert signal 56 to an appropriate frequency for processing. Such may be the case, for example, when signal 56 is at RF frequencies and the signal must be down converted to an appropriate frequency for processing. Thus, receiving circuitry 58 may comprise various mixers, filters, amplifiers, and so forth necessary to perform such a function. In other implementations, such as where signal 56 is received from a wired network such as a local telephone line, signal 56 may be processed directly. In such a situation, signal 56 and received signal 60 would be identical.

As previously explained, received signal 60 will comprise a plurality of substantially phase continuous waveforms and at least one pilot tone. The information transmitted by received signal 60 is encoded into the individual event widths of the plurality of substantially phase continuous waveforms. Thus, it becomes very important to measure the individual event widths with sufficient accuracy so as not to confuse one event width with another. This may be achieved by recovering the pilot tone from the received signal and then phase locking the receiver clocks used to extract the event widths to the pilot tone. Thus, embodiments within the scope of this invention may comprise means for recovering the pilot tone. By way of example, and not limitation, in FIG. 3 such means is illustrated by pilot tone recovery circuit 62. Pilot tone recovery circuit 62 may comprise any combination of hardware and/or software sufficient to produce a waveform that is phase synchronous with the pilot tone contained in received signal 60. Phase synchronous, as used herein, designates a waveform that is in phase with, or phase locked to, the pilot tone. In many cases it will be sufficient or desirable to simply recover the pilot tone in received signal 60. In other situations, it may be desirable to recover or generate a signal that is a multiple of the frequency of the pilot tone but which still is phase locked to the pilot tone. Thus, the term "pilot tone" should be interpreted broadly to include not only the original pilot tone but also any waveform that is phase synchronous with the pilot tone.

In FIG. 3, pilot recovery circuit 62 is designed to produce a clipped, almost square wave-type waveform with the same phase as the pilot tone contained in received signal 60. This is produced by first passing received signal 60 through narrowband filter 64 which is centered about the frequency of the pilot tone contained in received signal 60. Narrowband filter 64 should have an appropriate filter shape in order to minimize any energy from the other signals contained in received signal 60 from leaking into and contaminating the pilot tone. Thus, narrowband filter 64 will typically have a relatively narrow frequency width and steep roll off with very low sidelobes. The exact filter shape necessary to extract the pilot tone embedded in received signal 60 without contaminating the pilot tone with other signals in received signal 60 will be dependent upon the spectral content of received signal 60. Appropriate examples of signal sets with appropriate pilot tones are presented below.

The signal out of narrowband filter 64 will be a sinusoid having the frequency of the pilot tone contained in received signal 60. This signal may be input to amplifier 66 and then to limiter 68. Amplifier 66 amplifies the signal while limiter 68 will clip the tops of the sinusoid, effectively removing any amplitude noise from the signal. The resultant waveform will be much like a square wave with clean phase transitions. This type of waveform is a good candidate to use in a phase lock loop or other circuitry to phase lock a clock circuit to the waveform.

As will become more apparent from the discussion below, one limitation on the amount of data that can be transferred in a given bandwidth for the present invention is the clock frequency of the receiver. Another limitation is the ability to phase lock the receiver clock to an appropriate pilot tone. Thus, embodiments within the scope of this invention may comprise means for phase locking a receiver clock to a pilot tone. In FIG. 3, for example, such a means is illustrated by phase locked receiver clock 70. Phase locked receiver clock 70 will typically comprise a clock or other oscillator that operates at a frequency much much higher than the clock tone recovered by pilot recovery circuit 62. In the representative signal sets below, the pilot tone is at 500 Hz, while the receiver clock is 200 MHz. It is necessary, however, to ensure that this receiver clock maintains phase coherence with the receive signal. This is because, as explained below, the receiver clock is used to time the duration of the events which encode the data words of receive signal 60. Phase locked receiver clock 70 may, therefore, comprise a phase lock loop or other phase locking circuit, which are other examples of means for phase locking a receiver clock to the pilot tone of receive signal 60.

Many types of phase locking circuits are known in the art and many designs will suffice for the present invention. Phase locking circuits are typically characterized by an acquisition time and by a tracking accuracy. It is preferable that the phase locking circuitry used to lock the receiver clock to the pilot tone of received signal 60 have a relatively rapid acquisition time. Such is particularly useful if the transmitter producing the data begins transmitting actual data contemporaneously with the initial pilot tone. In such a situation, the receiver may have little or no time to acquire the pilot tone and phase lock the receiver clock to the pilot tone. In the alternative, upon initial transmission, the signal may be modified in order to allow sufficient acquisition time for a receiver, such as the receiver illustrated in FIG. 3, before actual data is transmitted. During this time, known data words may be transmitted to help evaluate the phase locking performance of the circuit. Such an acquisition may be performed, for example, during an initial handshake protocol between a transmitting system and a receiving system. The exact details of how such a procedure should be accomplished will be determined by design choices made in the phase locking circuitry used to implement phase locked receiver clock 70.

Another aspect that may influence the acquisition time of the phase locking circuitry is the frequency of the pilot tone in received signal 60. Typically, the acquisition of the phase of a signal requires several phase transitions before the phase locking circuitry can lock onto the tone. Thus, in certain embodiments it may be desirable to transmit a higher frequency pilot tone to allow more phase transitions in a shorter period of time, if acquisition time is of concern for a particular implementation.

As previously explained in conjunction with FIGS. 1A through 1C, certain embodiments of the present invention utilize a waveform structure which defines a particular time, called an epoch when all waveforms of received signal 60 realign. One of the important aspects of such an epoch time is that it allows a resynchronization or rezeroing of any accumulated phase errors that may have occurred during the epoch. Thus, embodiments within the scope of this invention may comprise means for resetting the phase lock at a designated time. Although such a means is not directly illustrated in FIG. 3, it is anticipated that the means will be part of phase locked receiver clock 70. In the alternative, such a means may be a separate circuit which provides an input to phase locked receiver clock 70 to reset the phase lock at a particular time. Even if the phase lock of phase locked receiver clock 70 is not reset at an epoch, the epoch provides a built-in duration over which accumulated phase errors must be maintained in order to provide a designated accuracy for receiver clock 70 for a given data transfer rate.

As mentioned previously, in some embodiments multiple pilot tones are used. In these embodiments, multiple pilot tone recovery circuits are used. Receiver clock 70 can then be phase locked to some weighted average of the multiple pilot tones. This may help offset some of the problems generated by transmission channels with a large degree of phase dispersion, where the phase shift is dependent on the frequency of the signal. It would also be possible to put pilot tones at each end of the frequency band used for the system and phase lock different receiver clocks to each pilot tone. In such an arrangement the upper pilot tone can phase lock a receiver clock that is used for the upper data channels and the lower pilot tone can phase lock a clock that is used for the lower data channels.

The receiver illustrated in FIG. 3 contains one processing channel for each of the substantially phase continuous waveforms contained in received signal 60. With the exception of the particular frequency of the different phase continuous signals contained in received signal 60, processing for each may be identical. Thus, in the discussion which follows a single processing channel will be described with the understanding that the design of a single processing channel may be applied, with appropriate modification, to any other processing channel.

In order to extract a single substantially phase continuous waveform from received signal 60 for processing, received signal 60 needs to be filtered. Thus, embodiments within the scope of this invention comprise means for filtering received waveform 60. By way of example, and not limitation, such a means is illustrated in FIG. 3 by narrowband filters 72. Narrowband filters 72 may be constructed as a bank of narrowband filters, each one being centered at a frequency sufficient to extract a separate one of the substantially phase continuous narrowband waveforms in received signal 60. Some considerations for narrowband filters 72 are illustrated in FIGS. 5A and 5B.

Typically, received signal 60 will comprise a sufficient number of substantially phase continuous waveforms to fill a large portion of the spectrum of the transmission channel. As explained below, there are several advantages to packing more waveforms into received signal 60. By packing more signals into receive signal 60, the frequency variation of each may be limited to a very small frequency variation. In other words, rather than having a single waveform which fluctuates in frequency over a wide spectrum, such would be replaced by multiple signals, each fluctuating over a much narrower spectrum. This, in turn, results in a signal with much greater energy in a narrower frequency band. By tailoring the filter shape of narrowband filter 72 to a narrower frequency spectrum, the amount of wideband noise competing with the signal is reduced and higher signal to noise ratios may result. There are, however, practical limitations as to the filter shapes. At some point, it becomes very difficult to provide a very narrowband filter. This may be dependent not only on the technology utilized to construct narrowband filter 72, but also on the frequency of narrowband filter 72. In general, the filter bandwidth may be measured as a percentage of the center frequency of the filter. Existing technology typically limits the bandwidth of a filter to some percentage of the center frequency of the filter. Thus, as center frequencies for the filters increase, the bandwidth of the filters, in an absolute sense, may also increase.

Figure 5A:
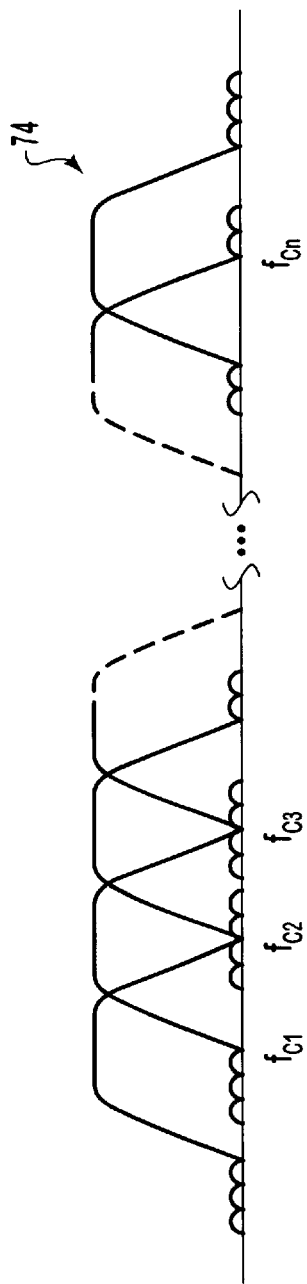
FIGS. 5A through 5B illustrate possible frequency spacings of a bank of narrowband filters for a receiver according to the present invention.
Figure 5B:
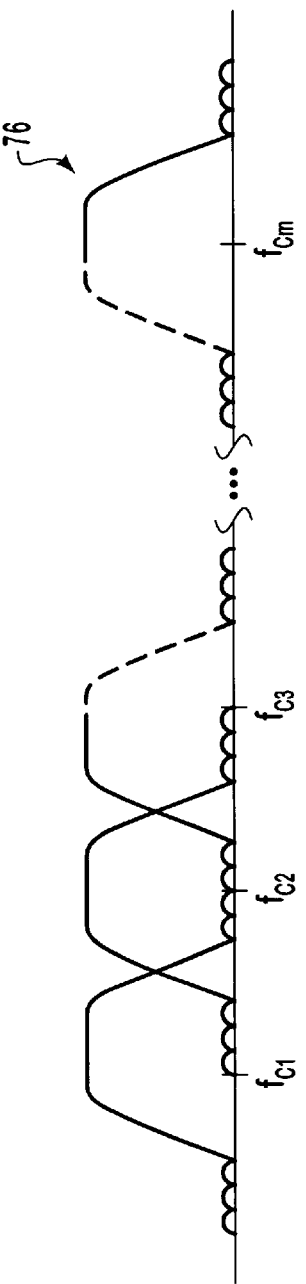

Referring first to FIG. 5A, a typical filter bank is shown generally as 74. The filter bank illustrated in FIG. 5A contains n filters, centered around center frequency $f_{c1}, f_{c2}, \ldots, f_{cn}$. Note that in FIG. 5A the filters are packed relatively tight in order to provide a virtual flat spectrum over the entire bandwidth used to cover the filters. In such a filter arrangement, a signal with energy that lies between two filters will show up as energy coming from both the two adjacent filters. This arrangement will probably not be suitable for many embodiments of the present invention. For the present invention, it is desirable that each of the substantially phase continuous waveforms produce energy in only one of the narrowband filters with little or no energy leaking into adjacent filters. Thus, it may be necessary to space filters farther apart, such as that illustrated in FIG. 5B where the filter spacing has been increased so that a signal which fluctuates over the pass band of one filter will produce little or no energy in adjacent filters. Thus, the filters for a receiver according to the present invention, such as narrowband filters 72, preferably have a filter shape with a steep enough roll-off and low enough sidelobes that energy from adjacent signals produces little or no effect in a given filter. Note that this will also require confining the frequency fluctuations of a given substantially phase continuous signal to the pass band of a given filter.

Returning now to FIG. 3, after the substantially phase continuous waveform has been extracted by narrowband filter 72, it is necessary to measure the width of each individual event in order to determine the data words encoded therein. Thus, embodiments within the scope of this invention may comprise means for detecting two consecutive zero crossings. By way of example, and not limitation, in FIG. 3 such means is illustrated by zero crossing detector 78. A wide variety of technologies may be utilized to build zero crossing detectors. In the present invention, the ability to measure the precise width of each event will result in more data which can be transferred for a given bandwidth. This is because more data bits may be transferred per event if the receiver is able to detect smaller variations between events. Unfortunately, detecting zero crossings can be a low signal to noise ratio event. In other words, the point at which a signal crosses the zero may be obscured by noise. Thus, in some situations it is desirable to build a zero crossing detector in such a manner that it is easier to identify the zero crossing points. One such zero crossing detector is illustrated in FIG. 3.

An examination of zero crossing detector 78 illustrates that the first block in the zero crossing detector is a transform block, f(x), 80. Any transform of the event may be utilized as long as it is possible to identify the particular zero crossing points on the transformed signal. In one embodiment it is desirable to construct transform block 80 to produce the waveform illustrated in FIG. 4. Note that the waveform illustrated in FIG. 4 contains a relatively sharp rise which crosses a particular threshold at time $T_1$. The waveform then peaks and ultimately decays to zero. The waveform then has a negative going portion that drops rapidly until it crosses a lower threshold at time $T_2$. The waveform then peaks and again decays to zero. If the time differential between $T_1$ and $T_2$ is the same as the event width, then it becomes much easier to detect the event width since the point at which the signal crosses either the upper or lower threshold is no longer a low signal to noise ratio event.

Figure 4:
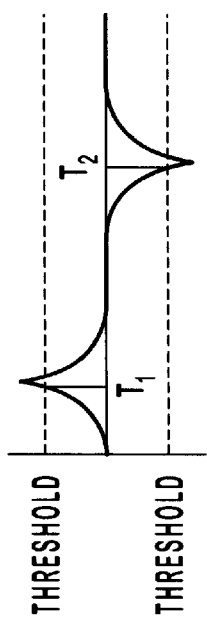
FIG. 4 illustrates an example waveform produced in an illustrative embodiment of a zero crossing detector.

A waveform such as that illustrated in FIG. 4 may be generated by transforming the event into a square wave and then differentiating the square wave. If the waveform has a very steep rise when the event crosses the zero point, then as long as the positive and negative thresholds are the same and as long as the waveform in FIG. 4 is symmetric (meaning that the positive and negative going portions are simply positive and negative versions of each other), then the time difference between $T_1$ and $T_2$ will be equal to the event width. Such a waveform may be approximated by first taking an individual event and running it through an amplifier and then putting the output of the amplifier into a limiter, such as the circuit illustrated in the clock recovery circuit by amplifier 66 and limiter 68. This will create a waveform with a very rapid rise and fall, while eliminating any amplitude noise on the waveform. By putting the output of the limiter through a differentiating circuit, the waveform of FIG. 4 can be generated. By setting appropriate thresholds, the width of the individual event can be recovered with a great degree of accuracy.

Returning now to FIG. 3, the output of transform block 80 is placed into threshold detector 82 where the output of the transform is compared to the appropriate thresholds in order to create a square pulse, the duration of which is equivalent to the duration of the event being decoded. The output of the threshold detector thus rises when the positive going threshold is crossed, maintains the output at a steady level, and then drops when the negative going threshold is crossed. The output of zero crossing detector 78 is thus a square pulse whose duration is equivalent to the duration of the event being decoded.

Although such a zero-crossing arrangement is sufficient when half sine waves are used for events, when other signals are used, modifications may need to be made. For example, if quarter sine waves are used for events, the duration of an event extends from a zero crossing to a peak (or from a peak to a zero crossing). In such a case, transform block 80 may be modified to produce a waveform where a zero crossing and a peak can be measured. Perhaps it will be sufficient to have transform block 80 produce something like a triangular wave where the peak is easily measured. In other situations, it may be desirable to use multiple transform blocks, one of which produces a transform like that in FIG. 4 where it becomes easy to measure the zero crossings and another which produces a transform where it is easy to measure the peaks. The appropriate transform can then put through a threshold detector and/or other circuitry to produce a square pulse with a duration equivalent to the duration of the event (zero crossing to peak or peak to zero crossing). Thus, as used herein, the term zero-crossing detector should be interpreted broadly to also include detectors that measure a peak or other characteristic of the event in order to determine the duration of the event.

The width of the output of the zero crossing detector may thus be measured by a means for measuring time difference between zero crossings or other event characteristics in order to extract the event width. By way of example, and not limitation, in FIG. 3 such means is illustrated by counter 84. As illustrated in FIG. 3, counter 84 is driven by phase locked receiver clock 70. This receiver clock allows counter 84 to measure a particular event for a given substantially phase continuous signal.

An examination of the structure that has been described thus far of the receiver illustrated in FIG. 3 will reveal several limitations on the maximum data rate that can be received and decoded by such a receiver. The first, and probably largest limitation, will be the frequency of receiver clock 70. When the output of zero crossing detector 78 is used to enable counter 84 which is driven by receiver clock 70, one clock tick is the smallest unit of resolution for counter 84. Thus, if counter 84 is driven at a higher frequency, then counter 84 can resolve finer distinctions between event widths. Using these principles, it is possible to derive a limitation on the number of bits that may be carried for an event (single half-period waveform). This relationship is given by:

$$N_{be} \leq \log_2(\Delta T f_{clock})$$

Where:

$N_{be}$ is the number of bits per event $\Delta T$ is the event width difference between the minimum and maximum frequencies of a particular signal $f_{clock}$ is the receiver clock frequency $\Delta T$, which is the event width difference between the minimum and maximum frequencies of a particular substantially phase continuous signal, may be calculated by the well-known relationship:

$$\Delta T = \frac{1}{2f_L} - \frac{1}{2f_H}$$

Where:

$\Delta T$ is the event width difference between the minimum and maximum frequencies of a particular signal $f_L$ is the lower frequency of the signal $f_H$ is the upper frequency of the signal Thus, from these equations we can see that as the clock frequency increases, the number of bits that can be carried by a single event also increases. Furthermore, as the frequency of the signal increases, the number of bits per event decreases. As illustrated below, however, the decreased number of bits per event is offset by the increased number of events that may fit into an epoch for higher frequency signals.

Another factor which limits the amount of data that can be transferred for a given bandwidth is the phase jitter on receiver clock 70. This phase jitter may come from a variety of sources. One source of phase jitter or phase error in receiver clock 70 is the ability to phase lock receiver clock 70 to the pilot tone contained in receive signal 60. In order to accurately identify the zero crossing points of an event structure in one of the substantially phase continuous signals contained in received signal 60, it is important to maintain phase coherence with the signals. This allows counter 84 to begin and end in phase with the received signal. In addition, the intrinsic stability of receiver clock 70 also contributes to phase error. If the phase error over an epoch time is sufficiently large, it will be reflected as an erroneous count in counter 84. This reduces the effective number of bits per event that can be transferred. In fact, if phase stability sufficient to receive the number of bits specified in the equation above cannot be maintained, then it is possible to simply "throw away" the least significant bit of the counter and encode the data word into the remaining bits. This will reduce the information carrying capacity of each event by one bit. It is currently envisioned that using existing technology will allow the fill number of bits specified by the equation above to be transmitted, particularly when the receiver structure illustrated in FIG. 3 is combined with the epoch structure discussed in FIGS. 1A through 1C so that at the end of an epoch time, the phase errors can be reset.

Returning now to FIG. 3, after each event has been received by the appropriate data channel, the data word of counter 84 will contain the information encoded into the event just received. The data word can then be extracted by means for determining the data word encoded into the pulse. By way of example, in FIG. 3 such means is illustrated by detector 86. The event width received and counted by counter 84 is a combination of the data word encoded into the data event and the frequency of the substantially phase continuous waveform. For example, referring back to FIG. 1A which illustrates a signal at frequency fL, suppose the event width of this frequency represents an all 1's data word. At the high frequency, illustrated in FIG. 1B, the event width may represent a data word containing all 0's. The data words in between the all 1 data word and the all 0 data word would then be encoded into event widths lying between the event width illustrated in FIG. 1A and the event width illustrated in FIG. 1B. In other words, when the all 1's data word was sent, counter 84, assuming sufficient number of bits, would time the $f_L$ event width. When the all 0 data was sent, counter 84 would time the $f_H$ event width. Thus, the true information lies in the difference between the $f_L$ count and the $f_H$ count. Thus, if counter 84 was of a sufficient width to count the entire $f_H$ event width, then detector 86 may be a subtraction circuit which subtracts the count of $f_H$ from the data word received. From this differential, it would be possible to determine the data word encoded into the event.

Because the information is actually carried in the count differential between the minimum and maximum event widths, the only portion of the data word from counter 84 that is of interest is the lower bits of counter 84. Thus, it is possible to reduce the size of counter 84 to simply cover the appropriate number of bits that carry the information. However, a degree of error robustness may be achieved by examining the more significant bits of the data word. For example, for each frequency channel the minimum and maximum frequencies are known. Thus, the minimum and maximum counts of the data word from counter 84 are also known. If the receiver tracks the more significant bits of counter 84, events that are abnormally short or long can be recognized and discarded as erroneous. It is possible to track the more significant bits of counter 84 by simply making counter 84 of sufficient width to time the maximum event width. In the alternative, it may be possible to track the number of times the counter "overflows," which is equivalent to tracking the most significant bits of a full counter.

In FIG. 3 only a single zero crossing detector and counter are shown for each data channel. In reality, however, multiple counters and/or zero crossing detectors will probably be required. This is because, depending on the implementation of counter 84, the data from the counter will not be able to be unloaded before the counter must begin timing the next event. Because a substantially phase continuous waveform is used, the end of one event corresponds to the beginning of the next event. If multiple zero crossing detectors are used, it is possible to construct one that detects zero crossing of positive going events and another which detects zero crossings of negative going events.

Because information is split up into a plurality of data words that are encoded into the various waveforms that make up receive signal 60, the data words must be reassembled in the proper order as they are received by a receiver. Thus, embodiments within the scope of this invention may comprise means for reassembling the data stream. By way example, such a means is illustrated in FIG. 3 by data buffer 88. Another benefit of the event structure illustrated in FIGS. 1A through 1C is that it makes it much easier to reassemble the data stream.

Consider for example that received signal 60 is comprised of a plurality of substantially phase continuous waveforms, each centered around a different frequency. Some of these frequencies will be relatively lower frequencies and have relatively fewer events in an epoch. Others will be relatively higher frequencies and have relatively more events in an epoch. Thus, while the lower frequencies may only carry a few data words encoded thereon, the higher frequencies will carry many data words encoded thereon. Furthermore, because the number of bits that can be carried in an event is dependent both upon the receiver clock frequency and on the minimum and maximum frequencies of the substantially phase continuous waveform, the data words for each of the different channels will be a different size. The data words of the higher frequency channels will be relatively shorter while the data words of the lower frequency channels will be relatively longer. Thus, it can become quite complicated to ensure that the data words are reassembled in the proper order.

The event structure illustrated in FIGS. 1A through 1C greatly simplify this process by making the reassemble a simple method of undoing what was done by the transmitter. In other words, it is relatively easy to determine the total number of bits that may be transmitted by any given frequency channel during an epoch. Thus, at the transmitter the data stream may be broken into data blocks, one data block for each of the individual data channels. The data blocks would contain the appropriate number of bits, based on the number of bits that can be transferred during an epoch. Then, each data channel would simply break the data blocks down into event data words, one after the other and transmit them sequentially. In the receiver end, the data words will be received, one by one and placed in the appropriate portion of data buffer 88 in order to reassemble the data stream in the proper order.

In some embodiments, it may be possible to maintain tight enough phase coherence that the concept of an epoch is unneeded. In such embodiments, the breaking down and reassembly of a data stream can be much more complex, but can still be accomplished. This is because the time that a particular event begins and ends on one data channel relative to the events that begin and end on other data channels in the transmitter maintain those same relationships in the receiver. Thus, something analogous to a "first-in first-out" algorithm can be developed, although the details may be slightly more complicated due to the fact that a lower frequency event may begin before a higher frequency event but end after a higher frequency event.

Although the receiver illustrated in FIG. 3 utilizes analog processing, it may also be possible to implement the receiver using digital technology or a combination of analog in digital technology. However, for some of the higher data throughput waveforms it may difficult to implement a receiver that performs the processing illustrated in FIG. 3 completely using today's digital technology. However, advances in technology may allow even waveforms that transfer a tremendous amount of data in a given bandwidth to be processed digitally. Given the description of the receiver in FIG. 3, the corresponding digital receiver may be easily derived by those of skill in the art.

The discussion below presents various signal sets and various considerations that should be taken into account when signal sets are selected to transfer data according to the present invention. The signal sets presented herein are designed to transfer data over a standard voice grade telephone line which has a frequency bandwidth beginning about 500 Hz and extending up to about 3.5 kHz. Receivers and transmitters, following the principles laid out in FIGS. 2 and 3, can be constructed to transmit and receive the signal sets using present day technology. Thus, it is anticipated that the data rates presented herein are within the realm of either current technology or, in the case of the higher frequency receive clock cases, technology that will be available in the not too distant future.

The systems and methods of the present invention are not limited to voice grade telephone lines. A wide variety of transmission channels may be used to transmit data according to the present invention. Some of these have already been discussed or implied. Another variation on the signaling scheme presented here is possible in certain embodiments of the present invention. In some environments, many frequency channels are available. Traditionally, these frequency channels are dedicated to various purposes. For example, in the DSL environment, three channels may be employed, an upstream data channel, a downstream data channel, and a voice telephone channel. In the satellite communication context, a single satellite may carry many frequency channels. Other examples also exist. Using the present invention, it is possible to place one transmit/receive waveform in each of these channels. The transmit/receive waveform would comprise a plurality of narrowband data channels, the associated substantially phase continuous waveforms, and at least one pilot tone as explained in conjunction with FIGS. 2 and 3 above. In such an environment, it may be possible to further increase the data carrying capacity by eliminating pilot tones from some frequency channels. In other words, if two frequency channels exist, each with its own transmit/receive waveform, it may be possible to eliminate the pilot tone from one transmit/receive waveform and replace it with another substantially phase continuous waveform having data words encoded into the events of the waveform. In the receiver, both frequency channels can be decoded by one or more receiver clocks phase locked to the pilot tone in the transmit/receive waveform of one frequency channel. Other arrangements are also possible. For example, if the frequency channels are much larger bandwidth than the 3 kHz available in voice grade telephone lines, multiple transmit/receive waveforms may be placed in a single frequency channel.

Signal set selection for a single transmit/receive waveform may proceed in a wide variety of ways. However, at the end of the process some basic results will have occurred. First, the bandwidth of the transmission channel will have been divided into a plurality of data channels. There is a tradeoff between the number of data channels that the bandwidth is divided into and the frequency variation of the substantially phase continuous waveforms that are carried within each of the data channels. In other words, dividing the transmission channel into fewer data channels will allow a wider frequency variation in each data channel and, as illustrated by the equation for the number of bits that can be encoded into each event, will allow more bits per event to be carried. On the other hand, if the frequency variation of one of the substantially phase continuous waveforms is excessive, the narrowband filter used to receive the waveform in the receiver will allow more noise than necessary to compete with the signal and, hence, will provide poor signal to noise ratio versus bit error rate performance. On the other hand, if the bandwidth of the transmission channel is divided into too many data channels, then the filters must be packed so close together that a substantial amount of interference from adjacent bands may occur. This is akin to the situation for the filter spacing illustrated in FIG. 5A. In general, the upper limit on the number of data channels that can be packed into a given transmission channel bandwidth will be determined by the need to reduce interchannel interference and hence by the filter shapes that are achievable.

The filter shapes also set a limit on the allowable frequency variation for a particular waveform in the data channel. In other words, assuming a filter shape has a relatively flat pass band and drops steeply at the edges, it is desirable to keep the frequency variations within the flat part of the pass band. This will set the minimum and maximum frequency fluctuations for each of the individual waveforms in the data channels. On the other hand, assuming appropriate filters can be constructed, then design may proceed from the mathematical equations presented herein and modified, as appropriate, to account for the actual filter shapes that are achievable using existing technology.

As previously presented, the number of bits per event is dependent upon the minimum and maximum frequency of the data channel, and the receiver clock frequency through the equations:

$$N_{be} \leq \log_2(\Delta T f_{clock}) \quad \Delta T = \frac{1}{2f_L} - \frac{1}{2f_H}$$

Assuming the epoch time is given by $T_E$ and that the epoch time is an integral multiple of the lower frequency of the data channel (the reasons for this will be presented later on), then the number of events per epoch is given by:

$$N_e = 2f_L T_E - 1$$

Where:

$N_e$ is the number of events per epoch $f_L$ is the lower frequency for the data channel $T_E$ is the epoch time In the above equation, one is subtracted from the total number of potential events to account for the makeup pulse. Given the number of bits per event, the number of events per epoch, and the epoch time, the total data carrying capacity of the data channel is given by the number of bits per event times the number of events per epoch divided by the epoch time:

$$R_{di} = \frac{N_{be} N_e}{R_E} = \frac{\log_2(\Delta T f_{clock})[2f_L T_E - 1]}{T_E}$$

Where:

$R_{di}$ is the data rate for the $i^{th}$ data channel, and the other symbols are as previously defined.

The total data rate over the entire bandwidth is the sum of the data rates of the individual data channels or:

$$R_{dT} = \sum_i R_{di}$$

Where:

$R_{dT}$ is the total data rate $R_{di}$ is the data rate for the $i^{th}$ data channel As one example, the frequency bandwidth of a standard telephone line is divided into six data channels, with a reference frequency of 1 kHz, 1.5 kHz, 2 kHz, 2.5 kHz, 3 kHz, and 3,5 kHz, The pilot tone will be 500 Hz. Given this basic signal set, the epoch length should be selected as an integral number of the point at which all the waveforms align with a zero phase. In other words, if each waveform begins at phase zero the point at which all the waveforms again line up at phase zero will be the minimum length of the epoch. The epoch may also be selected as an integral multiple of this number. With this signal set, it is easy to see that all these waveforms will align with zero phase at time $T_E = 2000$ μsec. Thus, the epoch time should be selected as an integral multiple of 2000 μsec.

When selecting the epoch time, one consideration that should be taken into account is the phase stability of the receiver clock. It is desirable to keep the accumulated phase errors from the receiver clock during a single epoch to be much less than the least significant bit of the counter, such as counter 84 of FIG. 3. On the other hand, since one makeup event is inserted each epoch time, to maximize data throughput it is desirable to select the epoch time as long as possible to minimize the number of makeup events per unit time in the waveform. Recall that during the makeup time of each data waveform no data is transmitted.

The table below lists the details of this signal set for a 200 MHz clock. As indicated in the table, at a 200 MHz clock rate, the maximum data rate is 226.5 kbps. For the approximately 3 kHz bandwidth of the telephone this results in an efficiency of about 75.5 bps per Hz of bandwidth.

TABLE 1

6 Data Channel Signal Set

| | Data Channel 1 | Data Channel 2 | Data Channel 3 | Data Channel 4 | Data Channel 5 | Data Channel 6 |
|---|---|---|---|---|---|---|
| Frequency (kHz) | | | | | | |
| $f_L$ | 1.0000 | 1.5000 | 2.0000 | 2.5000 | 3.0000 | 3.5000 |
| $f_H$ | 1.0892 | 1.5982 | 2.0418 | 2.5324 | 3.0468 | 3.5316 |
| Delta f | 0.0892 | 0.0982 | 0.0418 | 0.0324 | 0.0468 | 0.0316 |
| Event Time (μsec) | | | | | | |
| $T_L$ | 500.0000 | 333.3333 | 250.0000 | 200.0000 | 166.6667 | 142.8571 |
| $T_H$ | 459.0400 | 312.8533 | 244.8800 | 197.4400 | 164.1067 | 141.5771 |
| Delta T | 40.9600 | 20.4800 | 5.1200 | 2.5600 | 2.5600 | 1.2800 |
| Data Rate (200 MHz Receive Clock) | | | | | | |
| Bits/Event | 13 | 12 | 10 | 9 | 9 | 8 |
| Events/Epoch | 3 | 5 | 7 | 9 | 11 | 13 |
| kbps | 19.5 | 30 | 35 | 40.5 | 49.5 | 52 |
| Total kbps | 226.5 | | | | | |
| Makeup Event Width (μsec) | | | | | | |
| Minimum | 500.0000 | 333.3333 | 250.0000 | 200.0000 | 166.6667 | 142.8571 |
| Maximum | 622.8800 | 435.7333 | 285.8400 | 223.0400 | 194.8267 | 159.4971 |

One aspect of signal design that should be covered can be illustrated using the signal set of Table 1. In the signal set of Table 1, the makeup event of each data channel falls between some minimum and maximum value. Assuming the epoch time is an integral multiple of the low frequency of each of the data channels (e.g. the low frequency of each data channel is the reference frequency for that data channel), then the minimum event width will be equal to one half period sine wave at the low frequency. The longest makeup event will occur when all pulses in the epoch are transmitted at the high frequency. Note that this makeup event will be longer in duration (lower in frequency) than the makeup event at the low frequency. Care must be taken to ensure that the maximum length makeup pulse will not push energy into an adjoining frequency band. Pushing energy into an adjacent frequency band will possibly cause an error to occur in that frequency band. Because each frequency band will be receiving data events or a makeup event at any given time, situations can arise where one channel will be receiving a makeup event while another channel will still be receiving a data event. In order to prevent energy from a makeup event from bleeding into an adjacent channel, it is sufficient to ensure that the frequency of the makeup event is higher than the pass band of the next lowest data channel. In fact, it is desirable that the energy from a makeup event be received, at least in attenuated form, by the same filter that receives the data events. This maintains a substantially phase continuous waveform passing through the filter and will reduce ringing and other undesirable effects when a sharp phase transition is received by a narrowband filter. The minimum and maximum makeup event durations are indicated in Table 1.

Table 2 presents the data rate for the signal set of Table 1 as a function of clock frequency. Note the increase in data rate as the clock frequency is increased. For this signal set, every time the clock frequency doubles the data rate increases by about 24 kbps.

TABLE 2

Data Rate vs. Clock Frequency - 6 Data Channels

| Clock | Data Channel 1 | Data Channel 2 | Data Channel 3 | Data Channel 4 | Data Channel 5 | Data Channel 6 | Total (kbps) |
|---|---|---|---|---|---|---|---|
| 100 MHz | 18 | 27.5 | 31.5 | 36 | 44 | 45.5 | 202.5 |
| 200 MHz | 19.5 | 30 | 35 | 40.5 | 49.5 | 52 | 226.5 |
| 400 MHz | 21 | 32.5 | 38.5 | 45 | 55 | 58.5 | 250.5 |
| 800 MHz | 22.5 | 35 | 42 | 49.5 | 60.5 | 65 | 274.5 |

Additional representative signal sets are presented in Tables 3, and 4 and Tables 5A, 5B, and 6, and Tables 7A, 7B, and 8. Tables 3 and 4 present a 3-data channel signal set, Tables 5A, 5B, and 6 present an 11-data channel signal set and Tables 7A, 7B, and 8 present a 12-data channel signal set. For the 3-data channel signal set the epoch is 2,000 μsec and for the 11 and 12 data channel signal set the epoch has been selected as 4,000 μsec. The pilot tone for each is at 500 Hz. It is interesting to note that for the three data channel signal set, large portions of the data channel remain unused. (Note the large differences between the upper frequency of one data channel and the lower frequency of the next.) This is reflected in the relatively low data rate and relatively low efficiency, which is about 46.6 bps per Hz of bandwidth at 200 MHz receive clock frequency. In contrast, the efficiency for the 12-data channel system at 200 MHz receiver clock is about 118 bps per Hz of bandwidth. This efficiency is a dramatic improvement over any existing modulation scheme that can be implemented using current technology.

TABLE 3

3 Data Channel Signal Set

|  | Data Channel 1 | Data Channel 2 | Data Channel 3 |
|---|---|---|---|
| *Frequency (kHz)* | | | |
| $f_L$ | 1.0000 | 2.0000 | 3.0000 |
| $f_H$ | 1.0892 | 2.1785 | 3.0951 |
| Delta f | 0.0892 | 0.1785 | 0.0951 |
| *Event Time (μsec)* | | | |
| $T_L$ | 500.0000 | 250.0000 | 166.6667 |
| $T_H$ | 459.0400 | 229.5200 | 161.5467 |
| Delta T | 40.9600 | 20.4800 | 5.1200 |
| *Data Rate (200 MHz Receive Clock)* | | | |
| Bits/Event | 13 | 12 | 10 |
| Events/Epoch | 3 | 7 | 11 |
| kbps | 19.5 | 42 | 55 |
| Total (kbps) | 116.5 | | |
| *Makeup Event Width (μsec)* | | | |
| Minimum | 500.0000 | 250.0000 | 166.6667 |
| Maximum | 622.8800 | 393.3600 | 222.9867 |

TABLE 4

Data Rate vs. Clock Frequency - 3 Data Channels

| Clock Frequency | Data Channel 1 | Data Channel 2 | Data Channel 3 | Total (kbps) | Efficiency (bps/Hz) |
|---|---|---|---|---|---|
| 100 MHz | 18 | 38.5 | 49.5 | 106 | 42.4 |
| 200 MHz | 19.5 | 42 | 55 | 116.5 | 46.6 |
| 400 MHz | 21 | 45.5 | 60.5 | 127 | 50.8 |
| 800 MHz | 22.5 | 49 | 66 | 137.5 | 55 |

TABLE 5A

11 Data Channel Signal Set

|  | Data Channel 1 | Data Channel 2 | Data Channel 3 | Data Channel 4 | Data Channel 5 | Data Channel 6 |
|---|---|---|---|---|---|---|
| *Frequency (kHz)* | | | | | | |
| $f_L$ | 0.7500 | 1.0000 | 1.2500 | 1.5000 | 1.7500 | 2.0000 |
| $f_H$ | 0.7738 | 1.0427 | 1.2662 | 1.5234 | 1.7658 | 2.0103 |
| Delta f | 0.0238 | 0.0427 | 0.0162 | 0.0234 | 0.0158 | 0.0103 |
| *Event Time (μsec)* | | | | | | |
| $T_L$ | 666.6667 | 500.0000 | 400.0000 | 333.3333 | 285.7143 | 250.0000 |
| $T_H$ | 646.1867 | 479.5200 | 394.8800 | 328.2133 | 283.1543 | 248.7200 |
| Delta T | 20.4800 | 20.4800 | 5.1200 | 5.1200 | 2.5600 | 1.2800 |
| *Data Rate (200 MHz Receive Clock)* | | | | | | |
| Bits per Event | 12 | 12 | 10 | 10 | 9 | 8 |
| Events per Epoch | 5 | 7 | 9 | 11 | 13 | 15 |
| kbps | 15 | 21 | 22.5 | 27.5 | 29.25 | 30 |
| Total kbps | 226.5 | | | | | |
| *Makeup Event Width (μsec)* | | | | | | |
| Min. | 666.6667 | 500.0000 | 400.0000 | 333.3333 | 285.7143 | 250.0000 |
| Max. | 769.0667 | 643.36 | 446.08 | 389.6533 | 318.9943 | 269.2 |

TABLE 5B

11 Data Channel Signal Set

|  | Data Channel 7 | Data Channel 8 | Data Channel 9 | Data Channel 10 | Data Channel 11 |
|---|---|---|---|---|---|
| *Frequency (kHz)* | | | | | |
| $f_L$ | 2.2500 | 2.5000 | 2.7500 | 3.0000 | 3.2500 |
| $f_H$ | 2.2630 | 2.5080 | 2.7597 | 3.0058 | 3.2568 |
| Delta f | 0.0130 | 0.0080 | 0.0097 | 0.0058 | 0.0068 |
| *Event Time (μsec)* | | | | | |
| $T_L$ | 222.2222 | 200.0000 | 181.8182 | 166.6667 | 153.8462 |
| $T_H$ | 220.9422 | 199.3600 | 181.1782 | 166.3467 | 153.5262 |
| Delta T | 1.2800 | 0.6400 | 0.6400 | 0.3200 | 0.3200 |
| *Data Rate (200 MHz Receive Clock)* | | | | | |
| Bits Per Event | 8 | 7 | 7 | 6 | 6 |
| Events per Epoch | 17 | 19 | 21 | 23 | 25 |
| kbps | 34 | 33.25 | 36.75 | 34.5 | 37.5 |
| Total kbps | 226.5 | | | | |
| *Makeup Event Width (μsec)* | | | | | |
| Min. | 222.2222 | 200.0000 | 181.8182 | 166.6667 | 153.8462 |
| Max. | 243.9822 | 212.16 | 195.2582 | 174.02667 | 161.84615 |

TABLE 6

Data Rate vs. Clock Frequency - 11 Data Channels

| Clock Frequency | Data Channel 1 | Data Channel 2 | Data Channel 3 | Data Channel 4 | Data Channel 5 | Data Channel 6 |
|---|---|---|---|---|---|---|
| 100 MHz | 13.75 | 19.25 | 20.25 | 24.75 | 26 | 26.25 |
| 200 MHz | 15 | 21 | 22.5 | 27.5 | 29.25 | 30 |
| 400 MHz | 16.25 | 22.75 | 24.75 | 30.25 | 32.5 | 33.75 |
| 800 MHz | 17.5 | 24.5 | 27 | 33 | 35.75 | 37.5 |

TABLE 6-continued

Data Rate vs. Clock Frequency - 11 Data Channels

| Clock Frequency | Data Channel 7 | Data Channel 8 | Data Channel 9 | Data Channel 10 | Data Channel 11 | Total (kbps) |
|---|---|---|---|---|---|---|
| 100 MHz | 29.75 | 28.5 | 31.5 | 28.75 | 31.25 | 280 |
| 200 MHz | 34 | 33.25 | 36.75 | 34.5 | 37.5 | 321.25 |
| 400 MHz | 38.25 | 38 | 42 | 40.25 | 43.75 | 362.5 |
| 800 MHz | 42.5 | 42.75 | 47.25 | 46 | 50 | 403.75 |

TABLE 7A

12 Data Channel Signal Set

| | Data Channel 1 | Data Channel 2 | Data Channel 3 | Data Channel 4 | Data Channel 5 | Data Channel 6 |
|---|---|---|---|---|---|---|
| | Frequency (kHz) | | | | | |
| $f_L$ | 0.7500 | 1.0000 | 1.2500 | 1.5000 | 1.7500 | 2.0000 |
| $f_H$ | 0.7738 | 1.0427 | 1.2662 | 1.5234 | 1.7658 | 2.0103 |
| Delta f | 0.0238 | 0.0427 | 0.0162 | 0.0234 | 0.0158 | 0.0103 |
| | Event Time (μsec) | | | | | |
| $T_L$ | 666.6667 | 500.0000 | 400.0000 | 333.3333 | 285.7143 | 250.0000 |
| $T_H$ | 646.1867 | 479.5200 | 394.8800 | 328.2133 | 283.1543 | 248.7200 |
| Delta T | 20.4800 | 20.4800 | 5.1200 | 5.1200 | 2.5600 | 1.2800 |
| | Data Rate (200 MHz Receive Clock) | | | | | |
| Bits per Event | 12 | 12 | 10 | 10 | 9 | 8 |
| Events per Epoch | 5 | 7 | 9 | 11 | 13 | 15 |
| kbps | 15 | 21 | 22.5 | 27.5 | 29.25 | 30 |
| Total kbps | 355 | | | | | |
| | Makeup Event Width (μsec) | | | | | |
| Min. | 666.6667 | 500.0000 | 400.0000 | 333.3333 | 285.7143 | 250.0000 |
| Max. | 769.0667 | 643.3600 | 446.0800 | 389.6533 | 318.9943 | 269.2000 |

TABLE 7B

12 Data Channel Signal Set

| | Data Channel 7 | Data Channel 8 | Data Channel 9 | Data Channel 10 | Data Channel 11 | Data Channel 12 |
|---|---|---|---|---|---|---|
| | Frequency (kHz) | | | | | |
| $F_L$ | 2.2500 | 2.5000 | 2.7500 | 3.0000 | 3.2500 | 3.5000 |
| $F_H$ | 2.2630 | 2.5080 | 2.7597 | 3.0058 | 3.2568 | 3.5039 |
| Delta f | 0.0130 | 0.0080 | 0.0097 | 0.0058 | 0.0068 | 0.0039 |
| | Event Time (μsec) | | | | | |
| $T_L$ | 222.2222 | 200.0000 | 181.8182 | 166.6667 | 153.8462 | 142.8571 |
| $T_H$ | 220.9422 | 199.3600 | 181.1782 | 166.3467 | 153.5262 | 142.6971 |
| Delta T | 1.2800 | 0.6400 | 0.6400 | 0.3200 | 0.3200 | 0.1600 |
| | Data Rate (200 MHz Receive Clock) | | | | | |
| Bits per Event | 8 | 7 | 7 | 6 | 6 | 5 |
| Events per Epoch | 17 | 19 | 21 | 23 | 25 | 27 |

TABLE 7B-continued

12 Data Channel Signal Set

| | Data Channel 7 | Data Channel 8 | Data Channel 9 | Data Channel 10 | Data Channel 11 | Data Channel 12 |
|---|---|---|---|---|---|---|
| kbps | 34 | 33.25 | 36.75 | 34.5 | 37.5 | 33.75 |
| Total kbps | 355 | | | | | |
| | | Makeup Event Width ($\mu$sec) | | | | |
| Min. | 222.2222 | 200.0000 | 181.8182 | 166.6667 | 153.8462 | 142.8571 |
| Max. | 243.9822 | 212.1600 | 195.2582 | 174.0267 | 161.8462 | 147.1771 |

TABLE 8

Data Rate vs. Clock Frequency - 12 Data Channels

| Clock | Data Channel 1 | Data Channel 2 | Data Channel 3 | Data Channel 4 | Data Channel 5 | Data Channel 6 |
|---|---|---|---|---|---|---|
| 100 MHz | 13.75 | 19.25 | 20.25 | 24.75 | 26 | 26.25 |
| 200 MHz | 15 | 21 | 22.5 | 27.5 | 29.25 | 30 |
| 400 MHz | 16.25 | 22.75 | 24.75 | 30.25 | 32.5 | 33.75 |
| 800 MHz | 17.5 | 24.5 | 27 | 33 | 35.75 | 37.5 |

| Clock | Data Channel 7 | Data Channel 8 | Data Channel 9 | Data Channel 10 | Data Channel 11 | Data Channel 12 | Total (kbps) |
|---|---|---|---|---|---|---|---|
| 100 MHz | 29.75 | 28.5 | 31.5 | 28.75 | 31.25 | 27 | 307 |
| 200 MHz | 34 | 33.25 | 36.75 | 34.5 | 37.5 | 33.75 | 355 |
| 400 MHz | 38.25 | 38 | 42 | 40.25 | 43.75 | 40.5 | 403 |
| 800 MHz | 42.5 | 42.75 | 47.25 | 46 | 50 | 47.25 | 451 |

In summary, the present invention discloses systems and methods for high speed data transfer that are capable of transferring a vast amount of data in very little bandwidth using current technology. The systems employ a plurality of substantially phase continuous waveforms where the duration of each event of the waveform varies between some minimum and maximum value to encode a data word on each event of the waveform. In order to allow a receiver to detect the very small time differential between different signal widths, a clock tone is also placed in the waveform. In a receiver, this pilot tone is recovered and used to phase lock the receiver clock, which typically operates at much much greater frequency than the pilot tone. This phase locked receiver clock can then be used to time the zero crossings of each event in order to extract the data word encoded into each event of the narrowband signals. The individual substantially phase continuous waveforms are extracted from the receive signals via a bank of narrowband filters.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In a system where data is sent from a sending system to a receiving system over a band limited channel using a transmission waveform comprising a plurality of individual narrowband waveforms, each comprised of a plurality of substantially phase continuous events with a width based on the data word encoded thereby, a method for high speed data transfer between the sending system and the receiving system, comprising the steps of:

generating a plurality of substantially phase continuous narrowband waveforms, each comprising a plurality of substantially phase continuous events with a width that is dependent on a data word to be transferred by that event and that lies between a minimum and maximum value selected for each of the plurality of narrowband waveforms so that each of said narrowband waveforms occupies a relatively small portion of the bandwidth of the band limited channel;

generating at least one substantially phase continuous pilot tone;

defining an epoch time;

combining said plurality of narrowband waveforms and said at least one pilot tone into a transmit waveform having the epoch time;

transmitting said transmit waveform to the receiving system, wherein a single frame of data is transferred during said epoch time after which a new epoch is begun that transfers an additional frame of data; and while transmitting said transmit waveform, inserting a makeup time for any of said plurality of narrowband waveforms which fall short of said epoch time after all data words for the current frame of data have been transferred.

2. A method of high speed data transfer as recited in claim 1 wherein the step of generating a plurality of substantially phase continuous narrowband waveforms is performed by executing at least the steps of:

retrieving the data word to be sent by a selected one of said separate narrowband waveforms;

encoding the data word as an event that can be transmitted as part of the selected narrowband waveform so that the selected narrowband waveform is substantially phase continuous, and wherein the width of said event is determined by said data word to be sent and lies between the minimum and maximum frequency of the selected narrowband waveform;

transmitting said event so that the selected narrowband waveform is substantially phase continuous; and repeating the above steps for each of said separate narrowband waveforms until a pre-determined time length is reached.

3. A method of high speed data transfer as recited in claim 1 wherein the bandwidth of each narrowband waveform is less than about 33 percent of the bandwidth of the band limited channel.

4. A method of high speed data transfer as recited in claim 1 wherein the bandwidth of each narrowband waveform is less than about 10 percent of the bandwidth of the band limited channel.

5. A method of high speed data transfer as recited in claim 1 wherein the efficiency of the data transfer method when measured in bits per second per Hertz of bandwidth is greater than about 30 bits per second per Hertz of bandwidth.

6. A method of high speed data transfer as recited in claim 1 wherein the efficiency of the data transfer method when measured in bits per second per Hertz of bandwidth is greater than about 50 bits per second per Hertz of bandwidth.

7. In a system where data is sent from a sending system to a receiving system over a band limited channel using a transmission waveform comprising a plurality of individual narrowband waveforms, each comprised of a plurality of substantially phase continuous events with a width based on the data word encoded thereby, a method for high speed data transfer between the sending system and the receiving system, comprising the steps of:

generating a plurality of substantially phase continuous narrowband waveforms, each comprising a plurality of substantially phase continuous events with a width that is dependent on a data word to be transferred by that event and that lies between a minimum and maximum value selected for each of the plurality of narrowband waveforms so that each of said narrowband waveforms occupies a relatively small portion of the bandwidth of the band limited channel;

generating at least one substantially phase continuous pilot tone;

combining said plurality of narrowband waveforms and said at least one pilot tone into a transmit waveform and transmitting said transmit waveform to the receiving system;

receiving the transmit waveform at the receiving system;

passing the transmit waveform to a pilot recovery circuit that recovers said at least one pilot tone;

phase locking a receiving clock to said recovered said at least one pilot tone;

passing the transmit waveform to a plurality of narrowband filters, each designed to recover one of said plurality of narrowband waveforms;

passing the output of each filter to a separate detector that detects the beginning and ending of the events so that the width of the events in the narrowband waveform recovered by the associated narrowband filter can be measured; and based on the measured widths, recovering the data word transferred by a particular event.

8. A method of high speed data transfer as recited in claim 7, wherein each detector is a zero-crossing detector that detects consecutive zero crossings of the event.

9. A method of high speed data transfer as recited in claim 7, wherein each detector detects a zero crossing and a peak so that the time difference between the zero crossing and the peak can be measured.

10. A method for high speed transmission of a data stream from a sending system to a receiving system over a transmission channel with a given bandwidth, comprising the steps of:

dividing the bandwidth of the transmission channel into a plurality of data channels;

defining a separate narrowband waveform to be transmitted on each of said plurality of data channels to carry data between the sending system and the receiving system, each of said narrowband waveforms having a defined minimum and maximum frequency that will be used to transmit information;

dividing the data stream into a plurality of data words to be transmitted from the sending system to the receiving system;

generating a data waveform comprising said separate narrowband waveforms by performing at least the steps of:

(a) retrieving a data word to be sent by a selected one of said separate narrowband waveforms;

(b) encoding the data word as an event that can be transmitted as part of the selected narrowband waveform so that the selected narrowband waveform is substantially phase continuous, and wherein the width of said event is determined by said data word to be sent and lies between the minimum and maximum frequency of the selected narrowband waveform;

(c) transmitting said event so that the selected narrowband waveform is substantially phase continuous; and (d) repeating steps (a) through (c) for each of said separate narrowband waveforms until a pre-determined time length is reached; and (e) adding a makeup time for any of said separate narrowband waveforms that fall short of said pre-determined time length after a pre-determined number of data words has been encoded for each of said separate narrowband waveforms; and while said data waveform is being transmitted, combining said data waveform with at least one pilot tone and transmitting the resultant transmit waveform to the receiving system.

11. A method of high speed data transfer as recited in claim 10 further comprising the step of defining an epoch time during which a single frame of data will be transferred.

12. A method of high speed data transfer as recited in claim 11 wherein said epoch time is a multiple of the half-period time of said at least one pilot tone.

13. A method of high speed data transfer as recited in claim 11 wherein said epoch time is a multiple of the period of said at least one pilot tone.

14. A method of high speed data transfer as recited in claim 11 wherein said epoch time is a multiple of the quarter-period of said at least one pilot tone.

15. A method of high speed data transfer as recited in claim 10 wherein the difference between the minimum and maximum frequency for a given narrowband waveform is a small fraction of the bandwidth of the transmission channel.

16. A method of high speed data transfer as recited in claim 15 wherein said small fraction is less than about 15 percent.

17. A method of high speed data transfer as recited in claim 15 wherein said small fraction is less than about 10 percent.

18. A method of high speed data transfer as recited in claim 10 further comprising the steps of:

receiving the transmit waveform at the receiving system;

passing the transmit waveform to a pilot recovery circuit that recovers said at least one pilot tone;

phase locking a receiving clock to said recovered at least one pilot tone;

passing the transmit waveform to a plurality of narrowband filters, each designed to recover one of said plurality of narrowband waveforms;

passing the output of each filter to a separate detector that detects the beginning and ending of the events so that the width of the events in the narrowband waveform recovered by the associated narrowband filter can be measured; and based on the measured widths, recovering the data word transferred by a particular event.

19. A method of high speed data transfer as recited in claim 18 wherein each detector is a zero-crossing detector that detects consecutive zero crossings of the event.

20. A method of high speed data transfer as recited in claim 18 wherein each detector detects a zero crossing and a peak so that the time difference between the zero crossing and the peak can be measured.

21. A method of high speed data transfer as recited in claim 10 further comprising the steps of:

generating a second data waveform comprising a second set of a plurality narrowband waveforms, each of which comprises a plurality of events shaped so that each narrowband waveform is substantially phase continuous; and transmitting said second data waveform over a second transmission channel.

22. A method of high speed data transfer as recited in claim 10 wherein said events have a half sine wave shape.

23. A method of high speed data transfer as recited in claim 10 wherein said events have a quarter sine wave shape.

24. A method of high speed data transfer as recited in claim 10 further comprising the step of compressing the data stream prior to transmission to increase the effective throughput from the sending system to the receiving system.

25. A method of high speed data transfer as recited in claim 10 further comprising the step of encoding the data stream prior to transmission to allow at least some errors that occur on reception to be corrected by the receiving system.

26. A method for high speed transmission of a data stream from a sending system to a receiving system over a transmission channel with a given bandwidth, comprising the steps of:

dividing the bandwidth of the transmission channel into a plurality of data channels;

defining a separate narrowband waveform to be transmitted on each of said plurality of data channels to carry data between the sending system and the receiving system, each of said narrowband waveforms having a defined minimum and maximum frequency that will be used to transmit information;

dividing the data stream into a plurality of data words to be transmitted from the sending system to the receiving system;

generating a data waveform comprising said separate narrowband waveforms by performing at least the steps of:

(a) retrieving a data word to be sent by a selected one of said separate narrowband waveforms;

(b) encoding the data word as an event that can be transmitted as part of the selected narrowband waveform so that the selected narrowband waveform is substantially phase continuous, and wherein the width of said event is determined by said data word to be sent and lies between the minimum and maximum frequency of the selected narrowband waveform and wherein the size of the data words varies depending on the separate narrowband waveforms selected in step (a);

(c) transmitting said event so that the selected narrowband waveform is substantially phase continuous; and (d) repeating steps (a) through (c) for each of said separate narrowband waveforms until a predetermined time length is reached;

while said data waveform is being transmitted, combining said data waveform with at least one pilot tone and transmitting the resultant transmit waveform to the receiving system.

27. An apparatus for high speed data transmission over a transmission channel of a given bandwidth, comprising:

means for generating a pilot tone;

means for generating a data waveform comprising a plurality of substantially phase continuous waveforms, said means for generating comprising:

first means for generating a plurality of individual events which are combined to create a first substantially phase continuous waveform, each event having a width that corresponds to a data word to be transmitted and that lies between a first minimum and a first maximums;

means for inserting a makeup time into the first substantially phase continuous waveform;

second means for generating a plurality of individual events which are combined to create a second substantially phase continuous waveform, each event having a width that corresponds to a data word to be transmitted and that lies between a second minimum and a second maximum; and means for inserting a makeup time into the second substantially phase continuous waveform; and means for combining said data waveform and said pilot tone to result in a transmission waveform which contains data encoded as a series of substantially phase continuous events and a phase continuous pilot tone.

28. An apparatus for high speed data transmission as recited in claim 27 further comprising means for transmitting the transmission waveform to a receiving system.

29. An apparatus for high speed data transmission as recited in claim 27 further comprising means for dividing a data stream into a plurality of data words for transmission by said apparatus.

30. An apparatus for high speed data transmission as recited in claim 27 further comprising means for generating a second pilot tone different in frequency from said pilot tone.

31. An apparatus for high speed data transmission as recited in claim 27 wherein said means for generating further comprises a plurality of additional means for generating a plurality of individual events which are combined to create additional substantially phase continuous waveforms, each event having a width that corresponds to a data word to be transmitted and that lies between additional minimums and additional maximums.

32. An apparatus for high speed data transmission over a transmission channel of a given bandwidth, comprising:
- a pilot tone generator;
- a plurality of waveform generators, each waveform generator comprising at least one direct digital synthesizer, and each waveform generator taking as an input a sequence of data words, at least some of which are drawn from a data stream that is to be transmitted, and producing as an output a sequence of substantially phase continuous events, each with a width dependent on one of the sequence of data words and each width falling between a minimum width and a maximum width that is set for the particular waveform generator that produced the event; and
- a summing circuit that sums the output of the pilot tone generator and the plurality of waveform generators to produce a transmit waveform.

33. An apparatus for high speed data transmission as recited in claim 32 further comprising at least one controller for controlling the plurality of waveform generators.

34. An apparatus for receiving information via a transmit waveform comprising data words encoded into events of a plurality of narrowband waveforms, each event of the narrowband waveforms comprising a substantially phase continuous signal, the width of which is related to the data word encoded into the event, and wherein the transmit waveform further has encoded therein at least one pilot tone, said apparatus comprising:
- means for recovering the at least one pilot tone in order to produce a waveform having at least one frequency substantially equal to the at least one pilot tone;
- means for phase locking a local receiver clock to the recovered at least one waveform;
- means for filtering the transmit waveform to separate the plurality of narrowband waveforms contained therein so that each of the plurality of narrowband waveforms can be processed separately in order to extract the data encoded therein;
- means for processing each of the plurality of narrowband waveforms comprising:
  - means for detecting the beginning and ending of an event of one of the plurality of narrowband waveforms;
  - means, responsive to said means for detecting and said receiver clock, for measuring the time difference between said beginning and ending; and
  - means for determining the data word encoded into the event from the measured time difference.

35. An apparatus for receiving information via a transmit waveform comprising data words encoded into events of a plurality of narrowband waveforms, each event of the narrowband waveforms comprising a substantially phase continuous signal, the width of which is related to the data word encoded into the event, and wherein the transmit waveform further has encoded therein at least one pilot tone, said apparatus comprising:
- a pilot tone recovery circuit that takes as an input the transmit waveform and produces as an output at least one waveform that is substantially phase synchronous to the at least one pilot tone;
- a phase locked receive clock that is phase locked to the output of the pilot tone recovery circuit;
- a plurality of narrowband filters, each having a frequency response to pass one of the narrowband waveforms, in order to separate said one narrowband waveform for further processing;
- a plurality of detectors, one connected to each of the plurality of narrowband filters, each detector being adapted to detect the beginning and end of an event;
- a plurality of counters, one connected to each of the detectors, for measuring the time difference between the beginning and end of an event, each of said counters being connected to said receive clock; and
- at least one data detector that extracts a data word from the time difference measured by said plurality of counters.

\* \* \* \* \*